(12) United States Patent
Takeda (10) Patent No.: US 6,292,851 B1
(45) Date of Patent: Sep. 18, 2001

(54) SYSTEM FOR ALLOWING A SUPERVISORY MODULE TO OBTAIN ALARM AND STATUS INFORMATION FROM AT LEAST ONE SUPERVISED MODULE WITHOUT HAVING TO SPECIFY PHYSICAL ADDRESSES

(75) Inventor: Teruhito Takeda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/199,345

(22) Filed: Nov. 25, 1998

(30) Foreign Application Priority Data

Nov. 28, 1997 (JP) .................................................... 9-328228

(51) Int. Cl.[7] .................................................... G06F 13/14
(52) U.S. Cl. .............................. 710/19; 711/114; 360/69; 360/75
(58) Field of Search ............................... 710/19; 360/69, 360/75; 711/114

(56) References Cited

U.S. PATENT DOCUMENTS 5,652,839 * 7/1997 Giorgio et al. ...................... 709/224
5,890,204 * 3/1999 Ofer et al. ............................ 711/111
5,996,030 * 11/1999 Ofer ..................................... 710/19

FOREIGN PATENT DOCUMENTS

| 4-364646 | 12/1992 | (JP) . |
| 5-134997 A | 6/1993 | (JP) . |
| 06069977 A | 3/1994 | (JP) . |
| 09153023 A | 6/1997 | (JP) . |

* cited by examiner

Primary Examiner—Thomas Lee
Assistant Examiner—Abdelmoniem Elamin
(74) Attorney, Agent, or Firm—Rabin & Berdo, P.C.

(57) ABSTRACT

In a system having a supervisory module and at least one supervised module mounted on separate circuit cards in a common housing, the supervised module has a memory unit in which alarm and status information is stored by a processing unit, which gathers the alarm and status information from other integrated circuits in the supervised module. The supervisory module obtains the alarm and status information from the memory unit, without having to specify the physical addresses of integrated circuits and registers in the supervised module. The processing unit in the supervised module also makes register settings in the integrated circuits in the supervised module, on behalf of the supervisory module.

2 Claims, 9 Drawing Sheets

SYSTEM FOR ALLOWING A SUPERVISORY MODULE TO OBTAIN ALARM AND STATUS INFORMATION FROM AT LEAST ONE SUPERVISED MODULE WITHOUT HAVING TO SPECIFY PHYSICAL ADDRESSES

BACKGROUND OF THE INVENTION

The present invention relates to a system having a supervisory module and one or more supervised modules mounted on separate circuit cards in a single housing.

One example of this type of system is a communication switch having line interface modules connectable to various types of electrical and optical communication lines. A single supervisory module in the switch initializes the line interface modules, monitors their status during subsequent operation, runs diagnostic tests, and responds to alarms and other conditions by changing register settings in the integrated circuits in the line interface modules.

The supervisory module communicates with the line interface modules through supervisory interface circuits in the line interface modules. In conventional switching systems of this type, the supervisory interface circuits provide read and write access to the registers in the integrated circuits in a line interface module by having a processor in the line interface module specify the physical addresses of the registers.

The physical address of a register depends on the internal structure of the integrated circuit in which the register is disposed, and the way in which the integrated circuit is connected to the supervisory interface circuit. The physical addresses of all of the registers in the line interface modules must be programmed into the supervisory module. The supervisory module must also be programmed with all of the initial register settings that must be made in each integrated circuit in each line interface module.

A resulting problem is that when the internal configuration or initial settings of a line interface module are changed, the software of the supervisory module must also be changed. These software changes are time-consuming, and the altered software must be tested, which takes further time. System development and maintenance become troublesome and difficult, because each change in a line interface module requires a corresponding change in the supervisory module. The troubles and difficulties are multiplied if the change alters not only register addresses, but also the meaning of the information placed in the registers.

These problems are not limited to line interface modules in switching systems.

SUMMARY OF THE INVENTION

It is accordingly an object of the present invention to provide a system in which a supervised module can be modified without requiring modification of the supervisory module.

Another object of the invention is to speed up the process of supervising the supervised module.

The invented system has a supervisory module and at least one supervised module. The supervisory module and supervised module are mounted on separate circuit cards in a common housing, and are interconnected by a supervisory interface signal line, through which the supervisory module sends control information to a supervisory interface circuit in the supervised module, and receives alarm and status information from the supervisory interface circuit.

The supervised module has a memory unit that stores the alarm and status information, control information, and a control program, and a processing unit that executes the control program. By executing the control program, the processing unit gathers the alarm and status information from other integrated circuits in the supervised module, writes the alarm and status information at predetermined addresses in the memory unit, transfers the alarm and status information from the memory unit to the supervisory interface circuit, and uses the control information received from the supervisory module to change internal settings of the other integrated circuits in the supervised module.

The memory unit preferably also stores initial settings with which the processing unit initializes the integrated circuits in the supervised module at power-up.

According to one aspect of the invention, the processing unit converts the physical addresses of registers in the integrated circuits in the supervised module to addresses in the memory unit, permitting the supervisory module to obtain alarm and status information and change register settings by specifying addresses in the memory unit, instead of by specifying the physical register addresses themselves.

According to another aspect of the invention, the supervisory module sends command identifiers and command type codes to the supervised module. Each command identifier corresponds to an area in the memory unit in the supervised module, and to a command processing task executed by the processing unit in the supervised module. Different command type codes enable the supervisory module to read and write data in the memory unit, have the processing unit execute a command processing task, and determine when the command processing task has been completed.

Since the supervisory module specifies command identifiers, or predetermined addresses in the memory unit, instead of the physical addresses of registers in the supervised module, the supervised module can be modified without need for modifications in the supervisory module.

Alarm and status information can be placed in consecutive addresses in the memory unit, for high-speed transfer to the supervisory module.

In a system with more than one supervised module, the processing units in the supervised modules can execute initialization processing or command processing tasks in parallel, thereby also speeding up system supervision.

DETAILED DESCRIPTION OF THE INVENTION

Embodiments of the invention will be described with reference to the attached illustrative drawings, in which identical constituent elements are denoted by identical reference characters.

Figure 1:
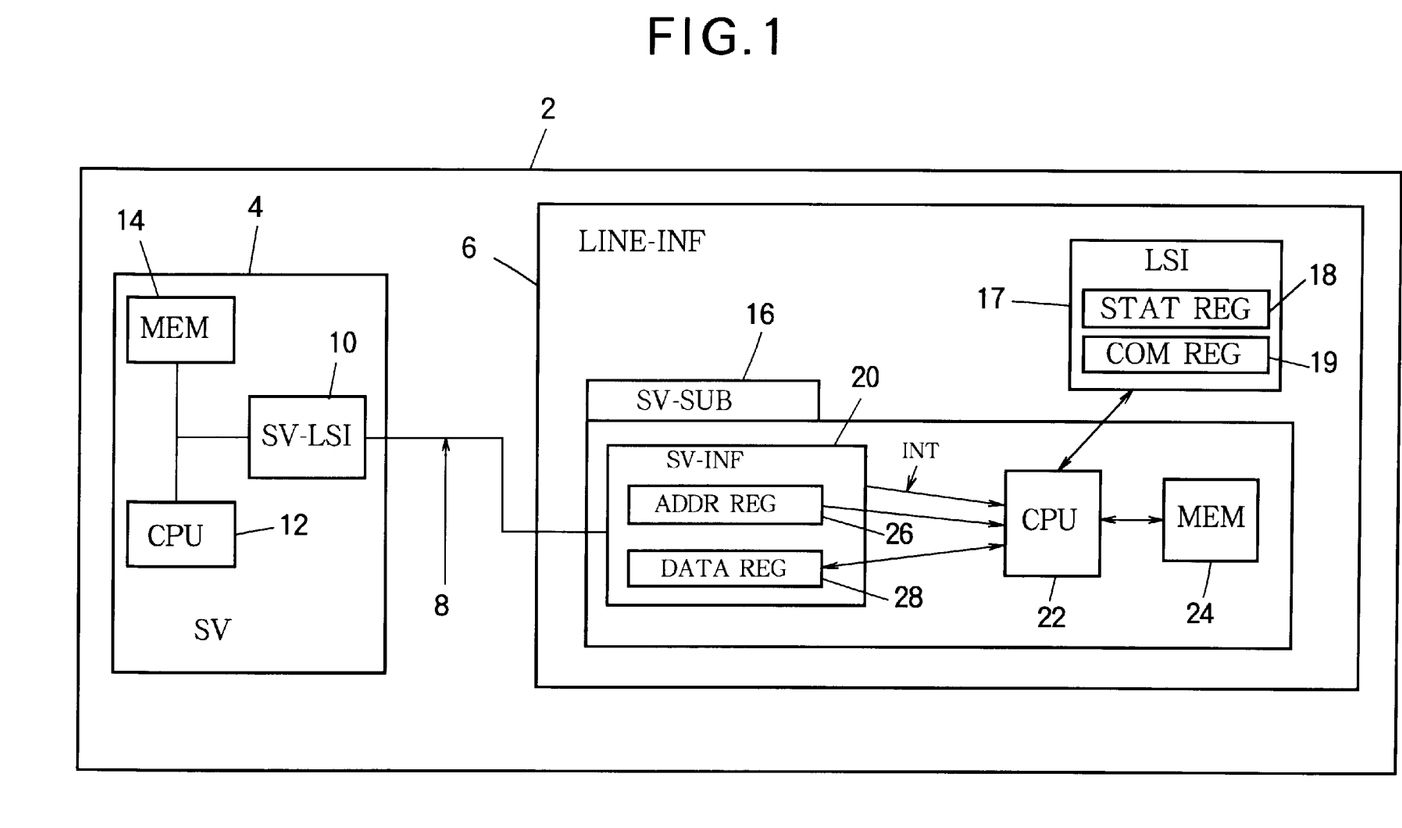
FIG. 1 is a block diagram of a supervisory module and a line interface module in a system illustrating a first embodiment of invention.

Illustrating a first embodiment of the invention, FIG. 1 shows a communication system 2 comprising a supervisory (SV) module 4 that supervises and controls a line interface (INF) module 6. Modules 4 and 6 are interconnected by a supervisory interface signal line 8. The system 2 includes other line interface modules and other types of application modules, such as coding, decoding, and switching modules (not visible), which are coupled to the same supervisory module 4 in a star topology by separate supervisory interface signal lines (not visible). Physically, the modules are rack-mounted circuit cards or packs housed in, for example, a desktop-size cabinet and interconnected via a backplane (not visible).

The supervisory module 4 comprises a large-scale integrated supervisory interface control circuit (SV-LSI) 10, which terminates the serial interface signal lines 8 from all of the supervised modules in the system 2, and a central processing unit (CPU) 12, which executes a control program stored in a memory unit (MEM) 14. The supervisory interface control circuit 10, processing unit 12, and memory unit 14 are interconnected by a common bus. By executing the control program in the memory unit 14, the CPU 12 communicates with the line interface module 6 and other application modules in the system 2, supervises their status, changes settings in the modules as necessary, and on occasion sends reset commands or other commands to the modules.

The line interface module 6 comprises a supervisory sub-module 16 and a plurality of large-scale integrated (LSI) circuits 17, only one of which is shown. The integrated circuits 17, which perform application functions such as statistical multiplexing and electro-optical conversion, are mounted on the main circuit card of the line interface module 6. The integrated circuits 17 have various internal status registers (STAT REGs) 18 from which alarm and status information can be read, and internal command registers (COM REGs) 19 in which settings are made to control the operation of the integrated circuits 17.

The supervisory sub-module 16 comprises a supervisory interface circuit 20, a CPU 22, and a memory unit 24, which are mounted on a sub-card attached to the main circuit card. The supervisory interface circuit 20, which terminates the supervisory interface signal line 8, has an address register 26 and a data register 28. The CPU 22 executes a control program that initializes the integrated circuits 17, collects status information from the integrated circuits 17, and responds to interrupt signals (INT) from the supervisory interface circuit 20.

The central processing units 12 and 22 are, for example, microprocessor units or microcontroller units. The supervisory interface control circuit 10 and supervisory interface circuit 20 are, for example, gate-array circuits.

Figure 2:
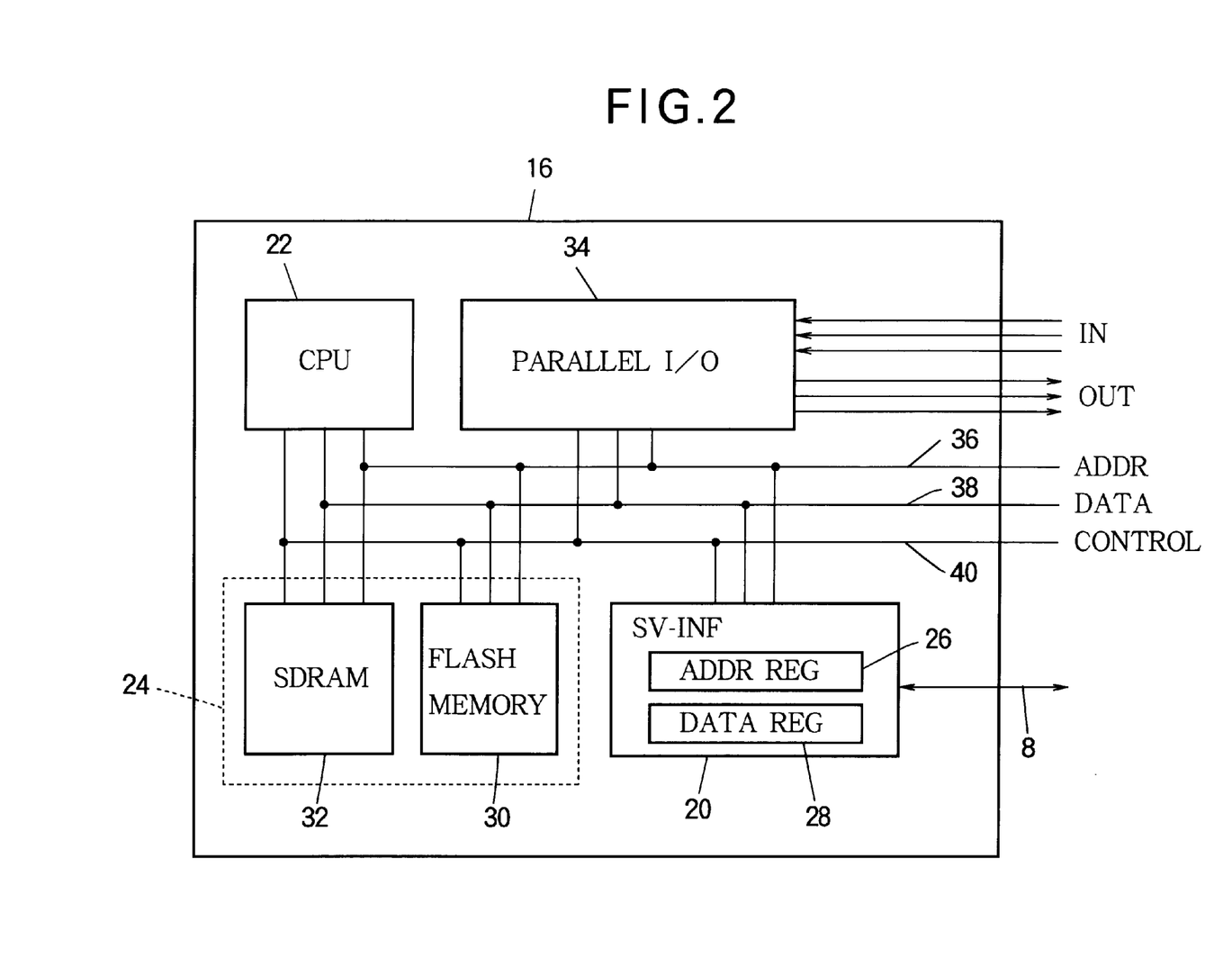
FIG. 2 is a more detailed block diagram of the supervisory sub-module in FIG. 1.

FIG. 2 shows the structure of the supervisory sub-module 16 in more detail. The memory unit 24 comprises a flash memory 30 that stores initialization data and the control program executed by the CPU 22, and a synchronous dynamic random-access memory (SDRAM) 32 that stores alarm, status, and control information. The supervisory sub-module 16 also has a parallel input/output circuit 34 that receives alarm signals and other signals from the integrated circuits 17 in the line interface module 6, and sends control signals that, for example, drive lamp indicators such as light-emitting diodes (not visible) in the line interface module 6. The components of the supervisory sub-module 16 are interconnected by an address (ADDR) bus 36, a data bus 38, and a control bus 40. These buses are also connected to the integrated circuits 17 in the line interface module 6, providing access to registers in the integrated circuits 17.

Figure 3:
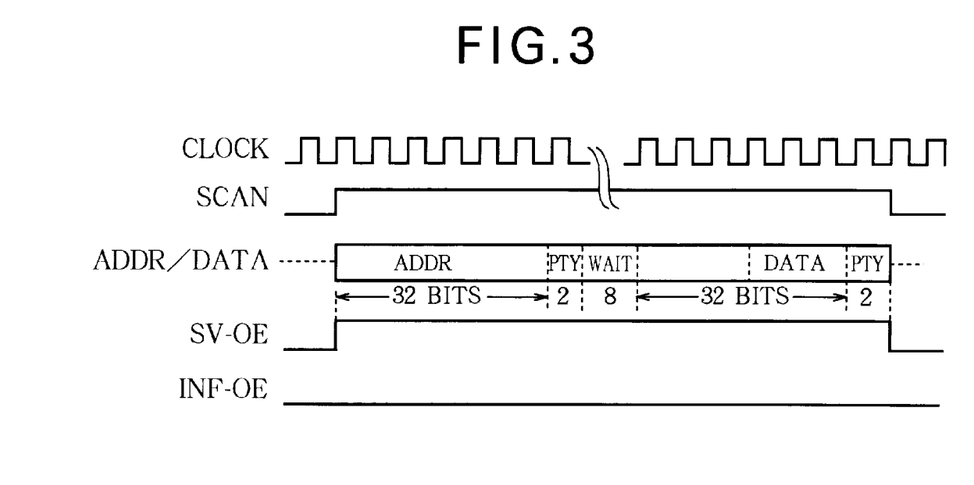
FIG. 3 is a timing diagram illustrating write access from the supervisory module to the line interface module in FIG. 1.

FIG. 3 shows the write-access signaling format on the supervisory interface signal line 8, used when the supervisory module 4 transfers data to the line interface module 6. Address information and data are transmitted on the supervisory interface signal line 8 in synchronization with a clock signal during an interval while a scan signal is active (high). The clock signal and scan signal are internal to the supervisory interface control circuit 10. During the interval while the scan signal is high, the supervisory interface control circuit 10 transmits a thirty-two-bit address (ADDR) followed by two parity bits (PTY), waits for eight clock cycles, then transmits thirty-two data bits, followed by two parity bits.

The supervisory interface control circuit 10 and supervisory interface circuit 20 have respective output enable (OE) signals that are activated (go high) to enable transmission on the supervisory interface signal line 8. In the sequence in FIG. 3, the output enable signal of the supervisory interface control circuit 10 (SV-OE) remains active throughout the interval while the scan signal is active, and the output enable signal of the supervisory interface circuit 20 (INF-OE) remains inactive.

Figure 4:
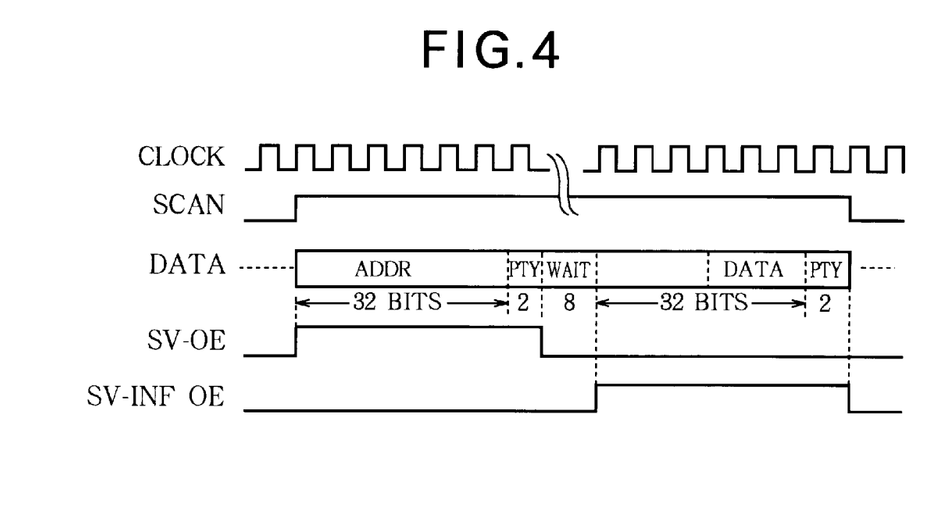
FIG. 4 is timing diagram illustrating read access from the supervisory module to the line interface module in FIG. 1.

FIG. 4 shows the read-access signaling format, used when the supervisory module 4 receives data from the line interface module 6. At first, the output enable signal (SV-OE) of the supervisory interface control circuit 10 is active and the output enable signal (INF-OE) of the supervisory interface circuit 20 is inactive. The supervisory interface control circuit 10 transmits thirty-two address bits and two parity bits, then deactivates its output enable signal and waits for eight clock cycles. Next, the supervisory interface circuit 20 activates its output enable signal and transmits thirty-two data bits and two parity bits.

Figure 5:
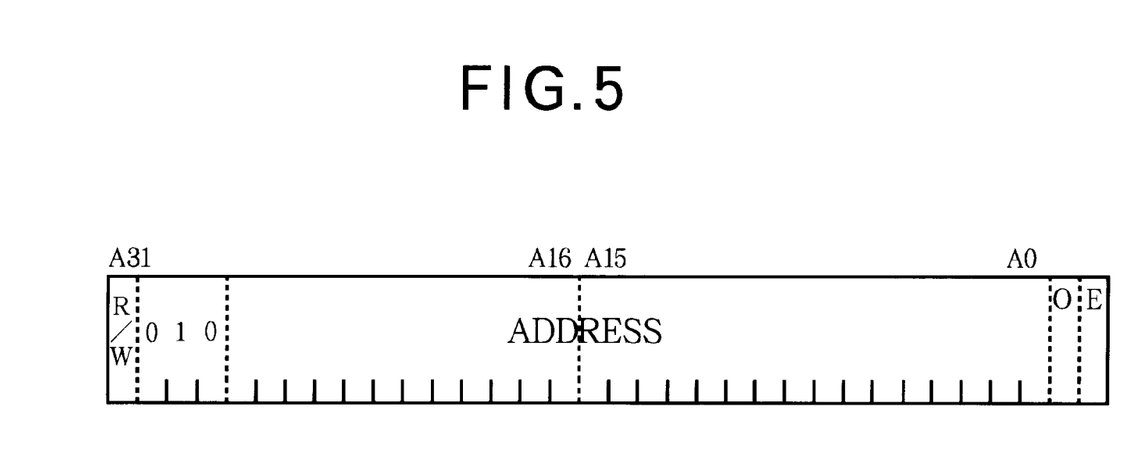
FIG. 5 illustrates the address format used in FIGS. 3 and 4.

FIG. 5 shows the address format. The address bits are numbered from A31 to A0. The first bit is a read/write flag (R/W) that indicates the direction of the data transfer. The next three bits have a fixed '010' pattern, which the supervisory interface circuit 20 uses as a synchronization pattern. The next twenty-eight bits include bits specifying an address in the SDRAM 32. The address bits are followed by an odd parity bit (O) and an even parity bit (E).

Figure 6:
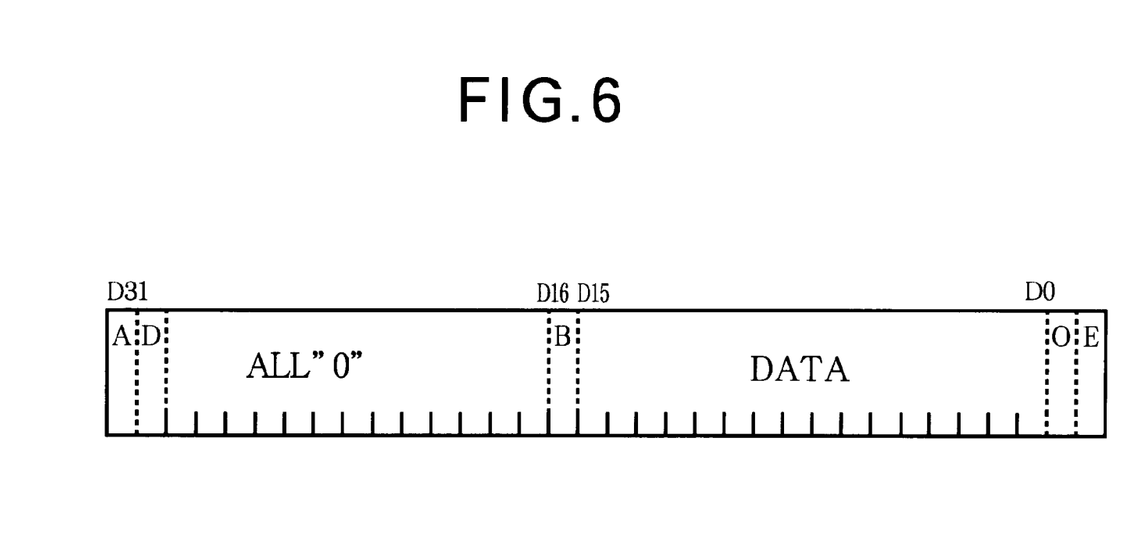
FIG. 6 illustrates the data format used in FIGS. 3 and 4.

FIG. 6 shows the data format. The data bits are numbered from D31 to D0. The first two bits are parity error flags indicating an address error (A) detected in the line interface module 6 or a data error (D) detected in the supervisory module 4. The next thirteen bits are always '0.' The next bit is a bus error flag (B), used to inform the supervisory module 4 of bus errors or time-out errors detected in the line interface module 6. These bits are followed by sixteen data bits, then by odd and even parity bits.

The interface format described above is only one of many possible formats. The other possible formats include three-wire interface formats, in which the supervisory module 4 transmits the clock and scan signals to the line interface module 6.

Next, the supervisory operation of the system will be described.

When system power is turned on, the CPU 22 in the supervisory sub-module 16 begins executing the control program stored in the flash memory 30. This program starts by initializing the integrated circuits 17 in the line interface module 6. The program then enters a loop that gathers information from the integrated circuits 17 as they operate, by reading the internal status registers 18 in the integrated circuits 17.

To read a specific status register 18 in a specific integrated circuit 17, the CPU 22 places a first address on the address bus 36, activates a read control signal on the control bus 40, and receives the register data on the data bus 38. Next, the CPU 22 writes the received data at a second address in the SDRAM 32, by placing the second address on the address bus 36, the data on the data bus 38, and a write control signal on the control bus 40. The first address includes the physical address of the integrated circuit 17 and the physical address of the register 18 being accessed. The second address is the physical address of a memory location in the SDRAM 32. The CPU 22 converts the first address to the second address by means of an address conversion table stored in the flash memory 30.

The CPU 22 also receives alarm signals from the integrated circuits 17 via the parallel input/output circuit 34, sets alarm flags at corresponding addresses in the SDRAM 32, and if necessary, activates alarm indicators via the parallel input/output circuit 34.

The CPU 12 in the supervisory module 4 executes a program by which it controls and supervises the line interface module 6 and other modules in the system 2. From time to time, this program transfers data to and from the line interface module 6, via the supervisory interface signal line 8, using the signaling formats shown in FIGS. 3 to 6. Each of these data transfers begins with the transfer of address information from the supervisory module 4 to the line interface module 6, causing the supervisory interface circuit 20 to send an interrupt signal to the CPU 22 in the line interface module 6.

Figure 7:
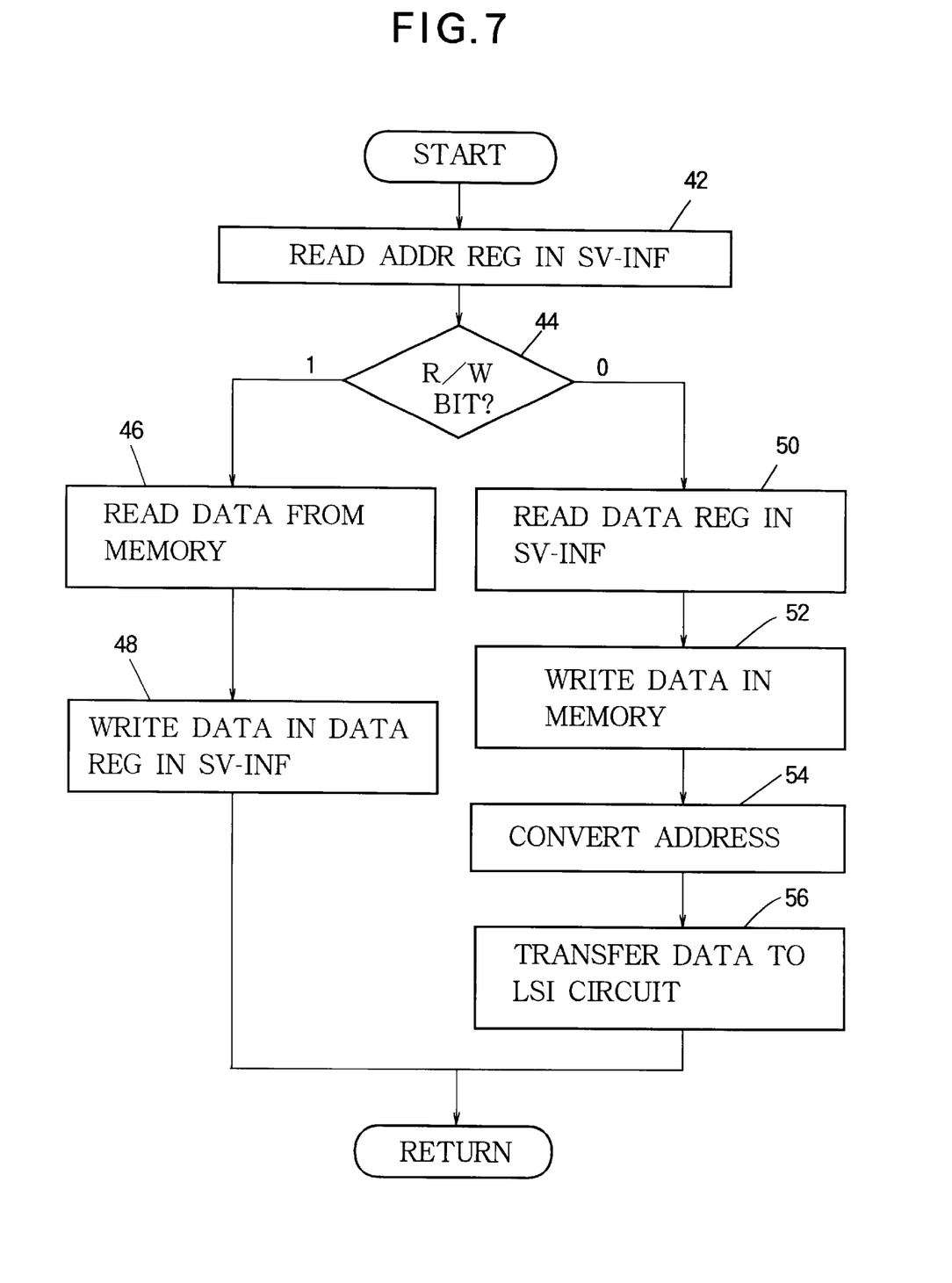
FIG. 7 is flowchart illustrating the operation of an interrupt service routine during read and write access.

FIG. 7 outlines the processing performed by the interrupt service routine that handles the interrupt from the supervisory interface circuit 20. In the first step 42, the interrupt service routine reads the address register 26 in the supervisory interface circuit 20, thereby obtaining the address information sent from the supervisory module 4. In the next step 44, the interrupt service routine tests the read/write bit in the address information.

If the read/write bit is set to one ('1'), indicating read access, then in step 46, the interrupt service routine reads the SDRAM 32 at an address specified in the address information, thus obtaining the data requested by the supervisory module 4. In step 48, the interrupt service routine writes the requested data in the data register 28 in the supervisory interface circuit 20, placing the address of the data register 28 on the address bus 36, the data on the data bus 38, and a write control signal on the control bus 40. The supervisory interface circuit 20 then transfers the data from the data register 28 to the supervisory interface control circuit 10.

If the read/write bit is zero ('0'), indicating write access, then in step 50, the interrupt service routine reads the data register 28 in the supervisory interface circuit 20, thereby obtaining data sent from the supervisory module 4. In step 52, the interrupt service routine writes the data into the SDRAM 32 at an address specified by the address information read in the first step 42. In step 54, the interrupt service routine converts this address to the physical address of an internal command register 19 in one of the integrated circuits 17, using the address conversion table in the flash memory 30. In step 56, the interrupt service routine places the converted address on the address bus 36, the data on the data bus 38, and a write control signal on the control bus 40, thereby transferring the data to the appropriate command register 19 in the appropriate integrated circuit 17.

Figure 8:
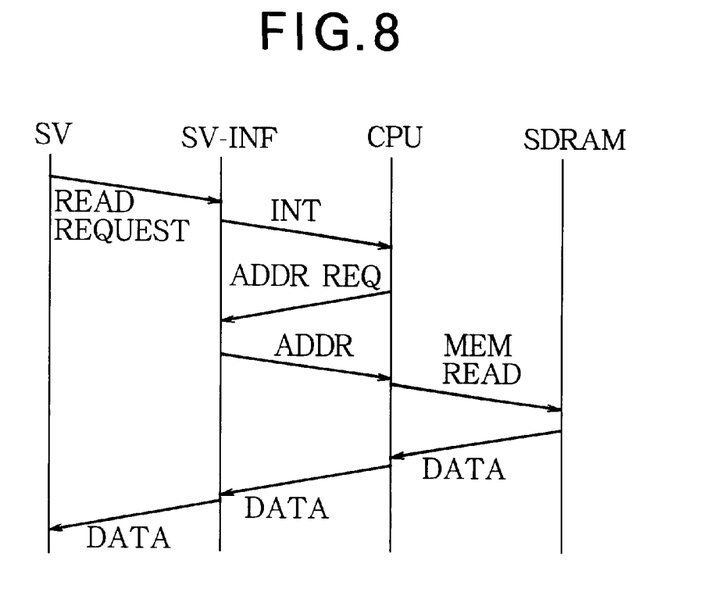
FIG. 8 signaling diagram illustrating read access.

FIG. 8 illustrates the signaling that takes place between the supervisory module 4, supervisory interface circuit 20, CPU 22, and SDRAM 32 during a read access. The supervisory module 4 begins by sending a read request (address information with the read/write bit set to '1') to the supervisory interface circuit 20. The supervisory interface circuit 20 sends an interrupt signal (INT) to the CPU 22. The CPU 22 sends an address request (ADDR REQ) by placing the address of the address register 26 on the address bus 36 and a read control signal on the control bus 40. The supervisory interface circuit 20 sends the address information (ADDR) to the CPU 22. The CPU 22 places part of the received address information on the address bus 36 and another read signal on the control bus 40, thereby reading data from the SDRAM 32. The data are sent from the SDRAM 32 to the CPU 22, then from the CPU 22 to the supervisory interface circuit 20, and from the supervisory interface circuit 20 to the supervisory module 4.

Figure 9:
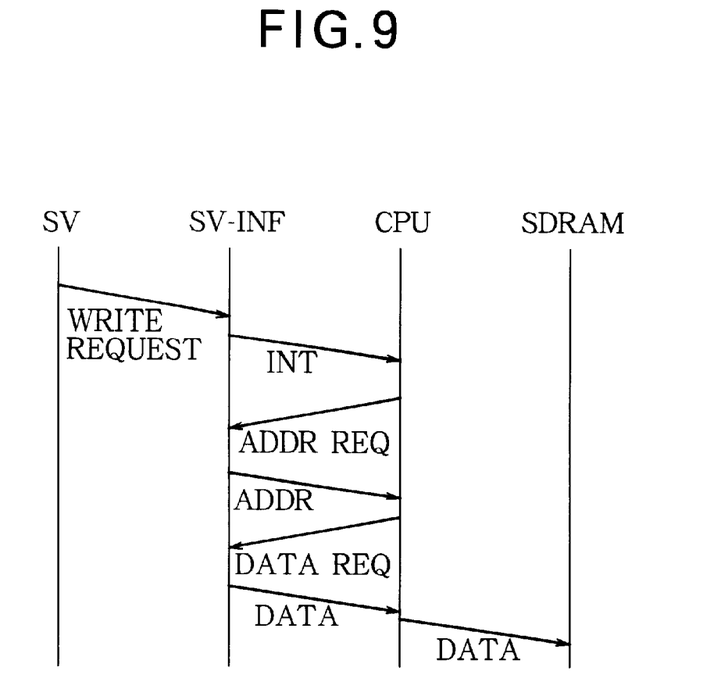
FIG. 9 is a signaling diagram illustrating write access.

FIG. 9 illustrates the signaling that takes place in a write access. The supervisory module 4 sends a write request (address information with the read/write bit cleared to '0,' followed by data) to the supervisory interface circuit 20. The supervisory interface circuit 20 sends an interrupt signal to the CPU 22. The CPU 22 sends an address request to the supervisory interface circuit 20. The supervisory interface circuit 20 sends the received address information to the CPU 22. The CPU 22 then sends a data request to the supervisory interface circuit 20, placing the address of the data register 28 on the address bus 36. The supervisory interface circuit 20 sends the received data to the CPU 22, which writes the data into the SDRAM 32 at an address specified in the address information. As shown in FIG. 7, the data are also transferred to the appropriate integrated circuit 17.

The operations described above enable the supervisory module 4 to supervise the status of the line interface module 6, monitor alarms, and change settings in the integrated circuits 17 in the line interface module 6 without having to specify the physical addresses of registers. In addition, the supervisory module 4 can send the line interface module 6 a command that restarts the control program executed by the CPU 22, causing the CPU 22 to re-initialize the integrated circuits 17.

Figure 10:
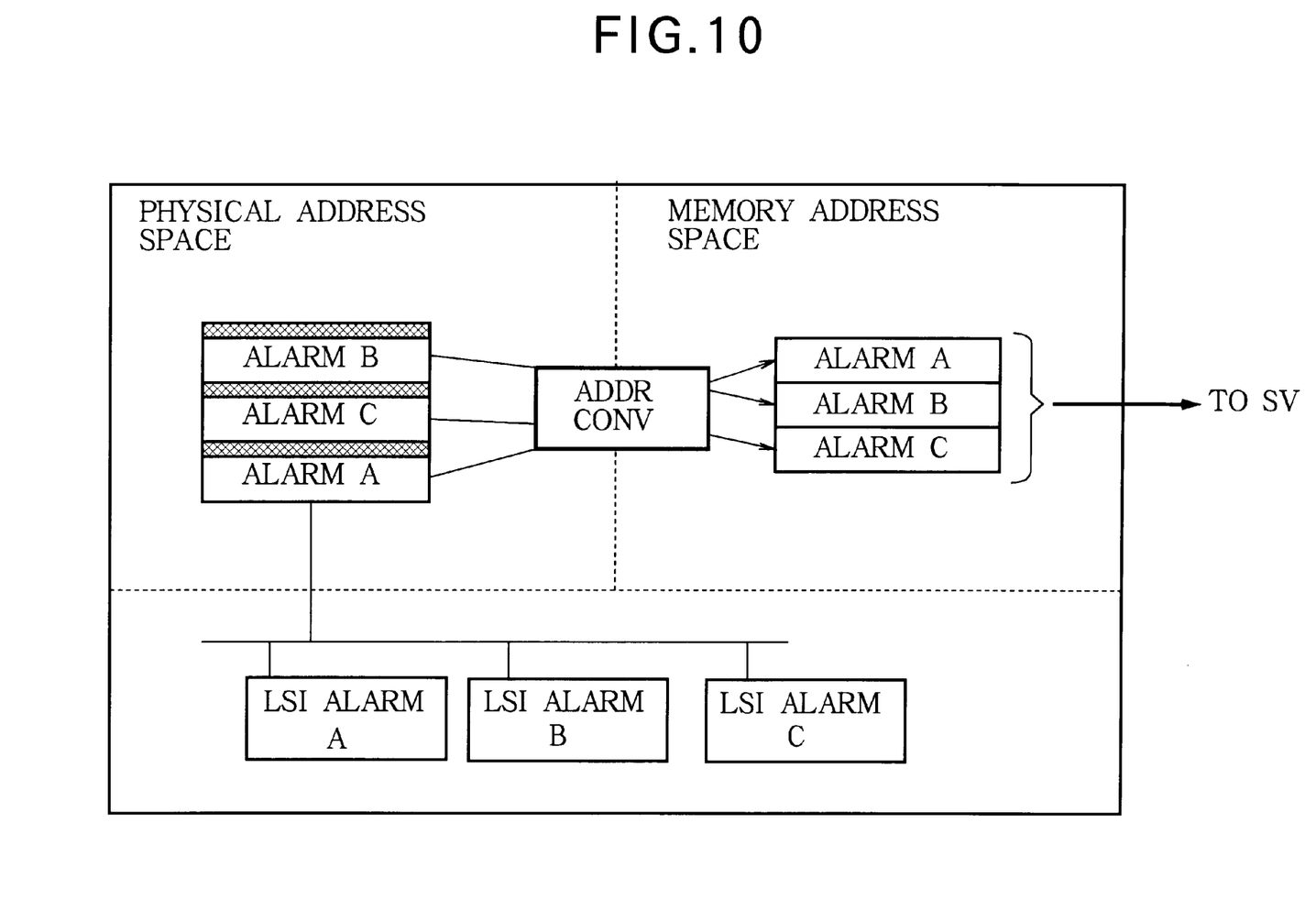
FIG. 10 is a conceptual diagram illustrating address conversion in the present invention.

FIG. 10 illustrates the effect of address conversion. Alarms A, B, and C represent alarm information from three different integrated circuits 17. In the physical address space of the line interface module 6, these alarms are obtained from addresses that depend on the wiring pattern on the main card of the line interface module 6, the internal structure of the integrated circuits 17, and the presence of other logic circuits such as address decoding circuits on the main circuit card in the line interface module 6. These physical addresses are apt to change when engineering changes are made to the line interface module 6. The CPU 22, however, converts the changeable physical addresses to predetermined memory addresses, so that the alarm information is stored at fixed, consecutive addresses in A-B-C order in the SDRAM 32. The supervisory module 4 obtains the alarm information from these fixed addresses in the SDRAM 32. If the physical addresses of the alarms are changed, the address conversion table in the flash memory 30 must be changed, but the alarm addresses in the SDRAM 32 are not changed, and the control program in the supervisory module 4 does not have to be changed.

Figure 11:
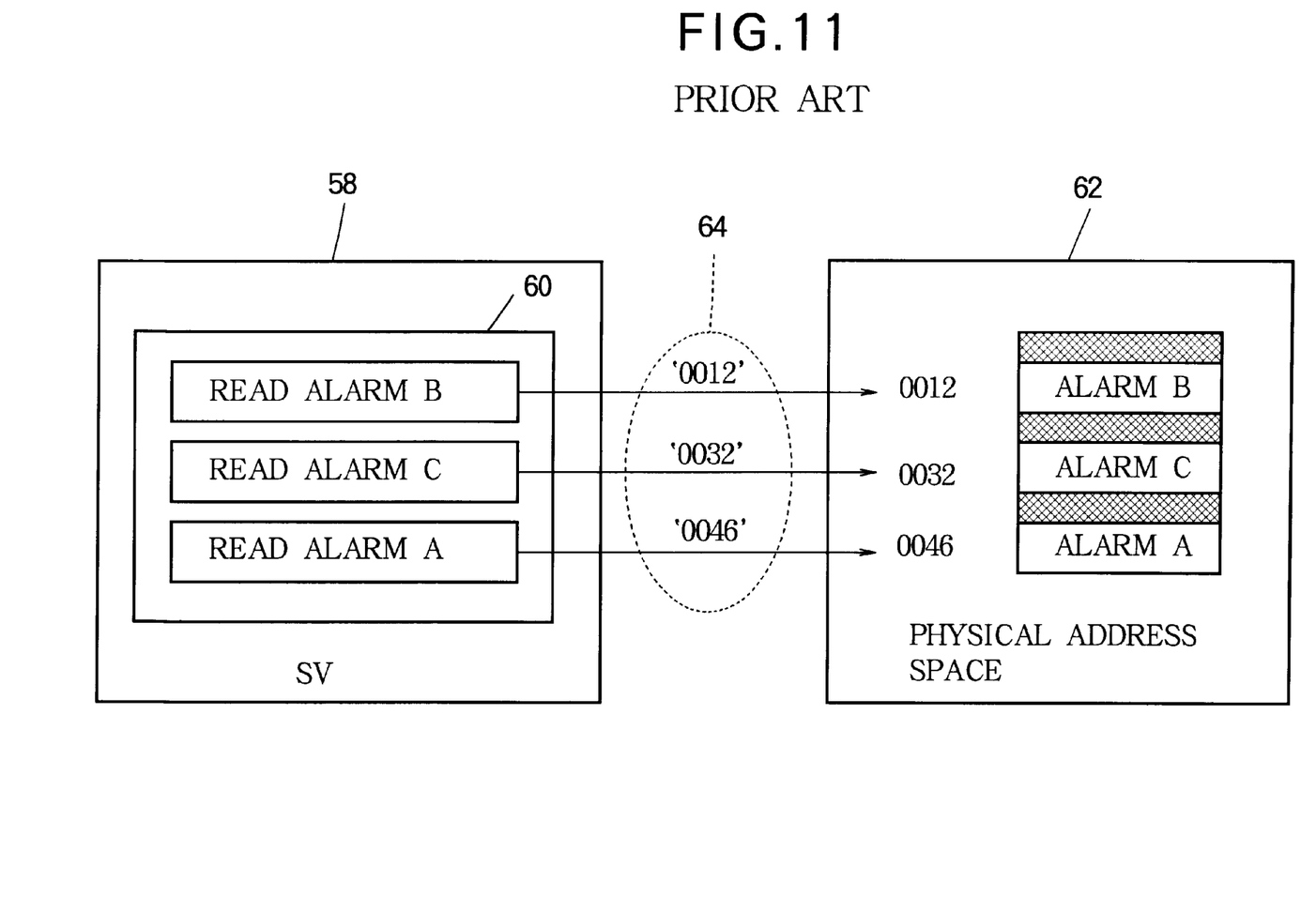
FIG. 11 is conceptual diagram illustrating the prior art.

For comparison, FIG. 11 shows a conventional system in which the supervisory module 58 has a control program 60 that generates the physical addresses of alarm information in a supervised module 62. For example, the control program 60 generates address '0046' to read alarm A, address '0012' to read alarm B, and address '0032' to read alarm C, and sends these addresses on the supervisory interface signal line 64. If the physical addresses in the supervised module 62 are changed, the control program 60 must also be changed.

The capability to modify register addresses in the line interface module 6 without modifying the control program in the supervisory module 4 is only one advantage of the first embodiment. Further advantages arise from the storage of initial settings of the integrated circuits 17 in the flash memory 30 in the supervisory sub-module 16, instead of the memory unit 14 in the supervisory module 4. One of these further advantages is that the initialization process can be carried out rapidly, because initialization data do not have to be transferred from the supervisory module 4 to the line interface module 6. Another advantage is that, in a system with more than one line interface module 6, all of the line interface modules (or other supervised modules) can be initialized simultaneously by their own CPUs, thus further speeding up the initialization process.

Yet another advantage is that the initial settings can be modified without modifying the supervisory module 4. For example, the initialization data stored in the flash memory 30 can be modified by on-board reprogramming of the flash memory 30, while the supervisory module 4 continues to supervise and control other modules in the system 2. Other changes to the control program of the CPU 22 can be made in the same say.

As a variation of the first embodiment, the signaling formats in FIGS. 3 to 6 can be altered to allow the transfer of a series of data from the line interface module 6 to the supervisory module 4 in response to a single read request from the supervisory module 4. The read request specifies, for example, the starting address and the desired amount of data. The CPU 22 in the supervisory sub-module 16 reads the specified amount of data from the SDRAM 32 by successively incrementing the starting address. The supervisory interface circuit 20 transfers the data to the supervisory module 4. For example, alarms A, B, and C in FIG. 10 can be read in this way, because the alarm information is stored at consecutive addresses in the SDRAM 32. This type of high-speed data transfer would not be possible in the conventional system shown in FIG. 11, because of non-consecutive addresses.

The first embodiment simplifies system development, maintenance, and upgrading by converting changeable physical addresses to unchanging memory addresses, permits efficient data transfer between the supervisory module 4 and the supervised modules by storing information at consecutive memory addresses, and enables rapid initialization.

The first embodiment resembles conventional supervisory systems, however, in that the supervisory module 4 controls the supervised modules by sending register settings to the supervised modules. Control operations that require many register settings may require the transfer of a considerable amount of data from the supervisory module 4 to a supervised module.

The second embodiment, described below, reduces the amount of data transfer and simplifies the control program executed by the CPU 12 in the supervisory module 4 by means of command abstraction. The second embodiment has the same hardware configuration as the first embodiment, shown in FIGS. 1 and 2. Instead of sending register settings to the line interface module 6, however, the CPU 12 in the supervisory module 4 sends the CPU 22 in the line interface module 6 abstract commands that cause the CPU 12 in the line interface module 6 to make the necessary register settings. Detailed control functions that were implemented in the supervisory module 4 in the first embodiment are thus implemented in the line interface module 6 in the second embodiment.

In the second embodiment, instead of sending address information including an address in the SDRAM 32 and a read/write bit, the supervisory module 4 sends the line interface module 6 a command identifier and a two-bit command type code. The read/write bit of the first embodiment is used as the first of the two bits of the command type code. The command identifier, besides identifying a process to be performed by the CPU 22, also identifies the locations of related areas in the SDRAM 32.

Figure 12:
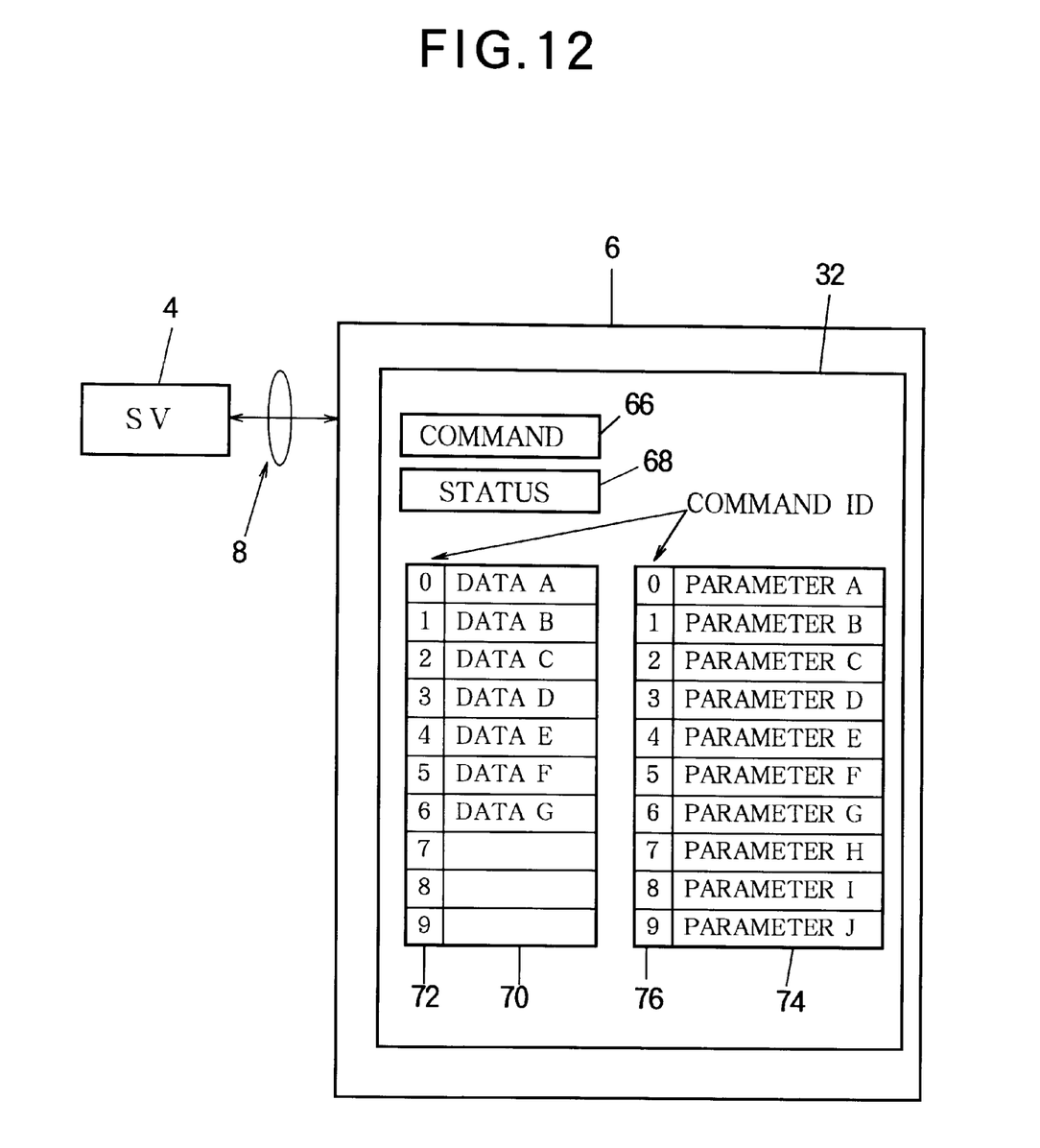
FIG. 12 is a memory map illustrating a second embodiment of the invention.

Referring to FIG. 12, the SDRAM 32 in the second embodiment has storage areas designated as a command area 66 and a status area 68. Command identifiers are set in the command area 66. The status area 68 indicates whether the CPU 22 is busy executing a preceding command, or has completed the preceding command and is ready to execute the next command. The initialization routine executed by the CPU 22 at power-up sets the status area 68 to indicate readiness to execute a command.

The SDRAM 32 also stores a data table 70 and a command table 74. The data table 70, which holds data received from the supervisory module 4 and data to be sent to the supervisory module 4, is divided into areas corresponding to the command identifiers (IDs) 72. The command table 74, which holds parameters and other information used in command processing, is likewise divided into areas corresponding to the command identifiers 76.

There are four types of commands, as listed in Table 1. A data read command requests the data stored in one of the areas of the data table 70. A status read command requests the value in the status area 68. A data write command writes data into the data table 70. A processing command causes the CPU 22 in the supervisory sub-module 16 to execute a command processing task, and may also write data into the data table

TABLE 1

Command Types

| Type code | Command type |
| --- | --- |
| 00 | Data read |
| 01 | Status read |
| 10 | Data write |
| 11 | Processing |

The control program of the CPU 22 includes an interrupt service routine that responds to interrupts from the supervisory interface circuit 20 by reading the command identifier and command type code from the address register 26 in the supervisory interface circuit 20, testing the command type code, reading the value of the status area 68, and taking appropriate action.

The interrupt service routine responds to a status read command by writing the status-area value into the data register 28 in the supervisory interface circuit 20, to be transferred by the supervisory interface circuit 20 to the supervisory module 4.

Other types of commands are ignored if the status area 68 indicates that the CPU 22 is currently busy executing a preceding command. If the CPU 22 is not busy, then the interrupt service routine takes action as follows.

For a data read command, the interrupt service routine reads data from the area in the data table 70 identified by the command identifier, and transfers the data to the supervisory module 4 via the data register 28 in the supervisory interface circuit 20.

For a data write command, the interrupt service routine receives data from the supervisory module 4 via the data register 28 in the supervisory interface circuit 20, and writes the data in the area in the data table 70 identified by the command identifier.

For a processing command, the interrupt service routine sets the command identifier in the command area 66, sets the status area 68 to indicate that the CPU 22 is busy, writes data (if any) accompanying the command in the corresponding area of the data table 70, then starts a command processing task identified by the command identifier. When the command processing task ends, the status area 68 is reset to the value indicating that the CPU 22 is not busy.

The command processing tasks, which are part of the control program stored in the flash memory 30, carry out various processes by making register settings in the integrated circuits 17 in the line interface module 6, and by gathering data from the integrated circuits 17. Register settings may be supplied by the supervisory module 4 via the data table 70, or generated by the command processing tasks from data in the data table 70, or generated independently by the command processing tasks. One command processing task preferably initializes all of the integrated circuits 17, using initial settings stored in the flash memory 30. Other command processing tasks may initialize individual integrated circuits 17.

During command processing, a command processing task may read and write information in the command table 74, which thus provides a means of passing parameters from one command processing task to another, or storing parameters that will be needed the next time the same command is processed. A command processing task may also set the information obtained from the integrated circuits 17 in the data table 70.

In the second embodiment, the control program in the supervisory module 4 performs the following basic sequence of operations. First, the supervisory module 4 sends a status read command to find whether the line interface module 6 has completed its latest command processing task. When a not-busy reply is obtained to the status read command, the supervisory module 4 uses a data read command to obtain the results of the completed command processing task, and a data write command to set necessary data (if any) related to the next command processing task. Then the supervisory module 4 issues the next processing command, possibly accompanied by further data related to the next command processing task.

This sequence is repeated cyclically for all of the line interface modules in the system 2. After issuing a processing command to one supervised module, before reading the results of the command, the supervisory module 4 can issue other processing commands to other supervised modules. The CPUs in two or more supervised modules can accordingly execute command processing tasks in parallel, enabling supervision processes involving a plurality of supervised modules to be completed more quickly than if all of the processing had to be done by the CPU in the supervisory module 4.

The second embodiment greatly simplifies the development and maintenance of software for the supervisory module 4. Because of the use of abstract commands, the supervisory module 4 can work with general information about the functions of the supervised modules, leaving the details of register settings to the CPUs in the supervisory sub-modules 16 of the supervised modules. A standard command interface can be used with different types of supervised modules.

When new types of line interface modules, or other application modules, are developed and installed, new supervision and control functions may have to be added to the supervisory module 4, but the second embodiment makes this comparatively easy, because the details of the functions are implemented in the application modules themselves. These advantages lead to savings in time and effort, and enable equipment to be developed and maintained at a reduced cost.

The second embodiment can be modified by allowing the CPU 22 in the supervisory sub-module 16 to report alarm conditions to the supervisory module 4 without waiting for the supervisory module 4 to issue a read command, and allowing the CPU 22 to execute certain supervisory and control processes without waiting for a processing command from the supervisory module 4. In high-speed communication systems, these modifications provide a useful method of responding quickly to alarms and other conditions.

In both the first and second embodiments, when the supervisory module 4 is coupled to a plurality of supervised modules, a bus topology can be used instead of a star topology.

The invention is not limited to the use of flash memory and synchronous dynamic random-access memory in the memory unit 24. The memory unit 24 may be partly or entirely integrated with the CPU 22.

The invention is not limited to the supervision of line interface modules in a communication system, but is generally applicable to the supervision of modules on separate circuit cards in a common housing.

Those skilled in the art will recognize that further variations are possible within the scope claimed below.

What is claimed is:

1. A system having a supervisory module and at least one supervised module, the supervisory module and the supervised module being mounted on separate circuit cards in a common housing, the supervisory module and the supervised module being interconnected by a supervisory interface signal line, the supervised module having a plurality of integrated circuits performing application functions and a supervisory interface circuit communicating with the supervisory module, the supervisory module supervising the operation of the supervised module by receiving alarm and status information from the supervisory interface circuit and sending the supervisory interface circuit control information for changing internal settings in said integrated circuits, the supervised module comprising:

a memory unit storing the alarm and status information, the control information and a control program; and a processing unit coupled to the memory unit, executing the control program, thereby gathering the alarm and status information from the integrated circuits, writing the alarm and status information at predetermined addresses in the memory unit, transferring the alarm and status information from the memory unit to the supervisory interface circuit, and changing internal settings of the integrated circuits according to the control information, wherein the control information comprises command identifiers corresponding to command processing tasks in the control program of the processing unit, and information related to the command processing tasks, and wherein the memory unit comprises:
- a command area for storing the command identifiers,
- a status area storing information indicating whether said processing unit is executing one of the command processing tasks, and
- a data table divided into areas corresponding to command storing the alarm and status information and the information related to the command processing tasks.

2. The system of claim 1, wherein the control information further comprises a command type code having a first value instructing the processing unit to send the alarm and status information from the data table to the supervisory module, a second value instructing the processing unit to send contents of the status area to the supervisory module, a third value instructing the processing unit to write the information related to the command processing tasks in the data table, and a fourth value instructing the processing unit to execute one of the command processing tasks.

* * * * *